United States Patent
Horn

(10) Patent No.: US 8,615,681 B2
(45) Date of Patent: Dec. 24, 2013

(54) SYSTEM AND METHOD FOR MAINTAINING A DATA REDUNDANCY SCHEME IN A SOLID STATE MEMORY IN THE EVENT OF A POWER LOSS

(75) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 390 days.

(21) Appl. No.: 12/967,206

(22) Filed: Dec. 14, 2010

(65) Prior Publication Data

US 2012/0151253 A1 Jun. 14, 2012

(51) Int. Cl.
*G06F 11/00* (2006.01)

(52) U.S. Cl.
USPC .......................................................... 714/24

(58) Field of Classification Search
USPC .......................................................... 714/24
See application file for complete search history.

(56) References Cited

U.S. PATENT DOCUMENTS

| | | | |
|---|---|---|---|
| 5,408,644 A | 4/1995 | Schneider et al. | |
| 5,499,337 A | 3/1996 | Gordon | |
| 6,467,022 B1 | 10/2002 | Buckland et al. | |
| 6,523,087 B2 | 2/2003 | Busser | |
| 6,959,413 B2 | 10/2005 | Humlicek et al. | |
| 7,069,382 B2 | 6/2006 | Horn et al. | |
| 7,200,715 B2 | 4/2007 | Kleiman et al. | |
| 7,409,492 B2 * | 8/2008 | Tanaka et al. | 711/103 |
| 7,640,390 B2 * | 12/2009 | Iwamura et al. | 711/103 |
| 7,653,778 B2 | 1/2010 | Merry, Jr. et al. | |
| 7,779,294 B2 | 8/2010 | Corrado et al. | |
| 7,856,528 B1 | 12/2010 | Frost et al. | |
| 8,321,597 B2 * | 11/2012 | Yu et al. | 710/5 |
| 8,402,217 B2 | 3/2013 | Burd | |
| 2004/0015657 A1 | 1/2004 | Humlicek et al. | |
| 2004/0123032 A1 | 6/2004 | Talagala et al. | |
| 2005/0066124 A1 | 3/2005 | Horn et al. | |
| 2005/0086429 A1 | 4/2005 | Chatterjee et al. | |
| 2005/0177672 A1 | 8/2005 | Rao | |
| 2006/0004957 A1 | 1/2006 | Hand, III et al. | |
| 2006/0236029 A1 | 10/2006 | Corrado et al. | |
| 2007/0268905 A1 | 11/2007 | Baker et al. | |
| 2007/0283079 A1 | 12/2007 | Iwamura et al. | |
| 2007/0294565 A1 | 12/2007 | Johnston et al. | |
| 2007/0297265 A1 | 12/2007 | Kim et al. | |
| 2008/0133969 A1 | 6/2008 | Manoj | |
| 2008/0141054 A1 | 6/2008 | Danilak | |
| 2008/0155160 A1 | 6/2008 | McDaniel | |

(Continued)

FOREIGN PATENT DOCUMENTS

WO  WO 2010049928 A1  5/2010

*Primary Examiner* — Bryce Bonzo

(57) ABSTRACT

Embodiments of the invention are directed to systems and methods for reducing an amount of backup power needed to provide power fail safe preservation of a data redundancy scheme such as RAID that is implemented in solid state storage devices where new write data is accumulated and written along with parity data. Because new write data cannot be guaranteed to arrive in integer multiples of stripe size, a full stripe's worth of new write data may not exist when power is lost. Various embodiments use truncated RAID stripes (fewer storage elements per stripe) to save cached write data when a power failure occurs. This approach allows the system to maintain RAID parity data protection in a power fail cache flush case even though a full stripe of write data may not exist, thereby reducing the amount of backup power needed to maintain parity protection in the event of power loss.

16 Claims, 5 Drawing Sheets

(56) References Cited

U.S. PATENT DOCUMENTS

| | | |
|---|---|---|
| 2008/0229148 A1 | 9/2008 | Forhan et al. |
| 2008/0276124 A1 | 11/2008 | Hetzler et al. |
| 2009/0073762 A1 | 3/2009 | Lee et al. |
| 2009/0083504 A1 | 3/2009 | Belluomini et al. |
| 2009/0150599 A1 | 6/2009 | Bennett |
| 2009/0172335 A1 | 7/2009 | Kulkarni et al. |
| 2009/0204852 A1 | 8/2009 | Diggs et al. |
| 2009/0210744 A1 | 8/2009 | Kamalavannan |
| 2009/0248998 A1 | 10/2009 | Sato et al. |
| 2009/0327604 A1 | 12/2009 | Sato et al. |
| 2009/0327803 A1 | 12/2009 | Fukutomi et al. |
| 2010/0049914 A1 | 2/2010 | Goodwin |
| 2010/0064111 A1* | 3/2010 | Kunimatsu et al. ........... 711/161 |
| 2010/0088557 A1* | 4/2010 | Weingarten et al. .......... 714/704 |
| 2010/0088579 A1 | 4/2010 | Hafner et al. |
| 2010/0115175 A9* | 5/2010 | Zhuang et al. ................ 711/103 |
| 2010/0122115 A1 | 5/2010 | Olster |
| 2010/0169543 A1 | 7/2010 | Edgington et al. |
| 2010/0262773 A1 | 10/2010 | Borchers et al. |
| 2010/0281202 A1* | 11/2010 | Abali et al. .................... 711/103 |
| 2011/0035548 A1* | 2/2011 | Kimmel et al. ................ 711/114 |
| 2011/0126045 A1* | 5/2011 | Bennett ........................ 714/6.22 |
| 2011/0173484 A1 | 7/2011 | Schuette et al. |
| 2011/0191649 A1 | 8/2011 | Lim et al. |
| 2011/0219259 A1* | 9/2011 | Frost et al. ..................... 714/6.2 |
| 2011/0264843 A1 | 10/2011 | Haines et al. |
| 2011/0314218 A1 | 12/2011 | Bert |
| 2012/0079318 A1* | 3/2012 | Colgrove et al. ........... 714/6.22 |
| 2012/0110376 A1* | 5/2012 | Dreifus et al. ............... 714/6.12 |
| 2012/0151253 A1 | 6/2012 | Horn |
| 2012/0173790 A1* | 7/2012 | Hetzler et al. ................ 711/103 |
| 2012/0233406 A1 | 9/2012 | Igashira et al. ............... 711/118 |
| 2012/0246403 A1* | 9/2012 | McHale et al. ............... 711/114 |

* cited by examiner

SYSTEM AND METHOD FOR MAINTAINING A DATA REDUNDANCY SCHEME IN A SOLID STATE MEMORY IN THE EVENT OF A POWER LOSS

BACKGROUND

Many data storage components such as hard disks and solid state drives have certain advertised reliability guarantees that the manufacturers provide to customers. For example, certain solid state drive manufacturers guarantee a drive failure rate of $10^{-16}$ or $10^{-17}$. To increase data reliability, a data redundancy scheme such as RAID (Redundant Arrays of Independent Disks) is used to increase storage reliability. The redundancy may be provided by combining multiple storage elements within the storage device into groups providing mirroring and/or error checking mechanisms. For example, various memory blocks of a solid state storage device may be combined into data stripes in which user data is stored.

BRIEF DESCRIPTION OF THE DRAWINGS

Systems and methods which embody the various features of the invention will now be described with reference to the following drawings, in which.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Embodiments of the invention are directed to systems and methods for reducing an amount of backup power needed to provide power fail safe preservation of a data redundancy scheme such as RAID that is implemented in non-volatile solid state storage devices.

A common approach to overcome storage element failure is to use redundant RAID (mirroring, parity, etc.) to allow data recovery should one or more failures (e.g., a read failure) occur. Typically, a target number of storage elements (i.e., sectors, flash pages, etc.) per stripe is chosen to achieve a desired reliability at a given cost in storage overhead. In a flash-based/solid state storage system, the read-modify-write standard approach for writing partial stripes cannot be supported. Instead, new write data is accumulated and written along with parity data. This new write data may be from host write commands and/or system data writes. Because new write data cannot be guaranteed to arrive in integer multiples of the stripe size, a full stripe's worth of new write data may not exist at the time power is lost.

In a system where cached write data must be guaranteed safe on non-volatile media even if power is lost, a common approach is to provide a temporary power source, such as a capacitive charge, to save write cache data to the non-volatile memory media after power is lost. The cost of this power source increases as the amount of time required for reliable power fail processing increases.

Various embodiments of the invention minimize power fail processing time by using truncated RAID stripes (fewer storage elements per stripe) to save cached write data when a power failure occurs. This approach allows the system to maintain RAID parity data protection in a power fail cache flush case even though a full stripe of write data may not exist in the write cache. In one embodiment, parity data is written in a page immediately after data in the partial stripe is written. The writing of truncated or partial stripes in the event of a power loss reduces the amount of write operations needed, and thus reduces the amount of backup power needed to maintain data parity protection in the event of a power loss. This reduced backup power requirement in turn reduces the cost of implementing the overall storage subsystem design.

System Overview

Figure 1:
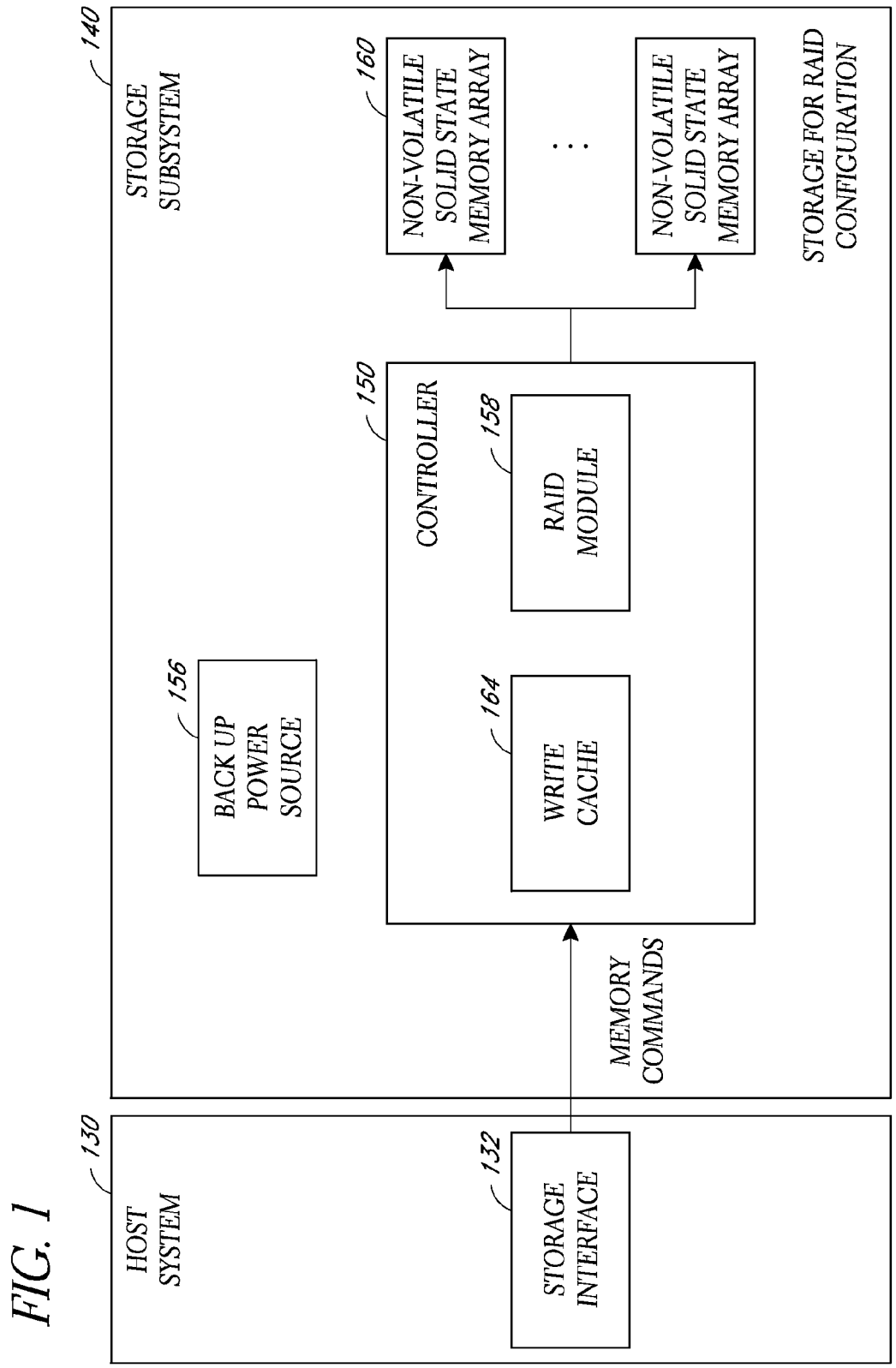
FIG. 1 is a block diagram illustrating a storage subsystem implementing a data redundancy scheme with a power loss recovery mechanism according to one embodiment.

FIG. 1 is a block diagram illustrating a storage subsystem implementing a data redundancy scheme with a power loss recovery mechanism according to one embodiment. As shown, a storage subsystem 140 includes a controller 150 and one or more non-volatile solid-state memory arrays 160. The controller 150 in one embodiment in turn includes a RAID module 158 and a write cache 164, which may be implemented in a volatile memory such as DRAM (Dynamic Random Access Memory). In another embodiment the write cache 164 is outside of the controller 150 in the storage subsystem 140. In one embodiment, the RAID module 158 is configured to execute data access commands to maintain a data redundancy scheme in the storage subsystem. For example, the RAID module 158 may maintain data on which storage elements are assigned to which RAID stripes and determine how data are arranged in the data redundancy scheme (e.g., grouped into stripes with parity). In one embodiment, the storage subsystem 140 also includes a backup power source 156 to supply power to the storage subsystem 140 when the regular source of power (e.g., from a host system 130) is interrupted. The backup power source 156 may be a capacitive charge that stores a limited amount of power that is sufficient to enable the controller 150 to take the necessary actions to preserve data integrity in the event of a power loss/interruption, including writing data that has been received but not yet written to the non-volatile memory array.

In one embodiment, the controller 150 of the storage subsystem 140 is configured to receive and execute commands from a storage interface 132 in the host system 130. The memory commands from the storage interface 132 may include write and read commands issued by the host system 130. As further shown in FIG. 1, in one embodiment, the controller 150 executes the received commands in one or more non-volatile solid-state memory arrays 160. The write cache 164 is configured to temporarily hold data to be written to the memory arrays 160, including data received from the host system 130 and/or system data. In one embodiment, the data is held in the write cache until it is written into the non-volatile solid-state memory arrays 160, after which the data is flushed from the write cache so the write cache can accommodate additional data.

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, those skilled in art will appreciate that RAID is not limited to storage devices with physical disks and is applicable to a wide variety of storage devices including the non-volatile solid state devices described herein.

Partial Stripe Writing Process

Figure 2:
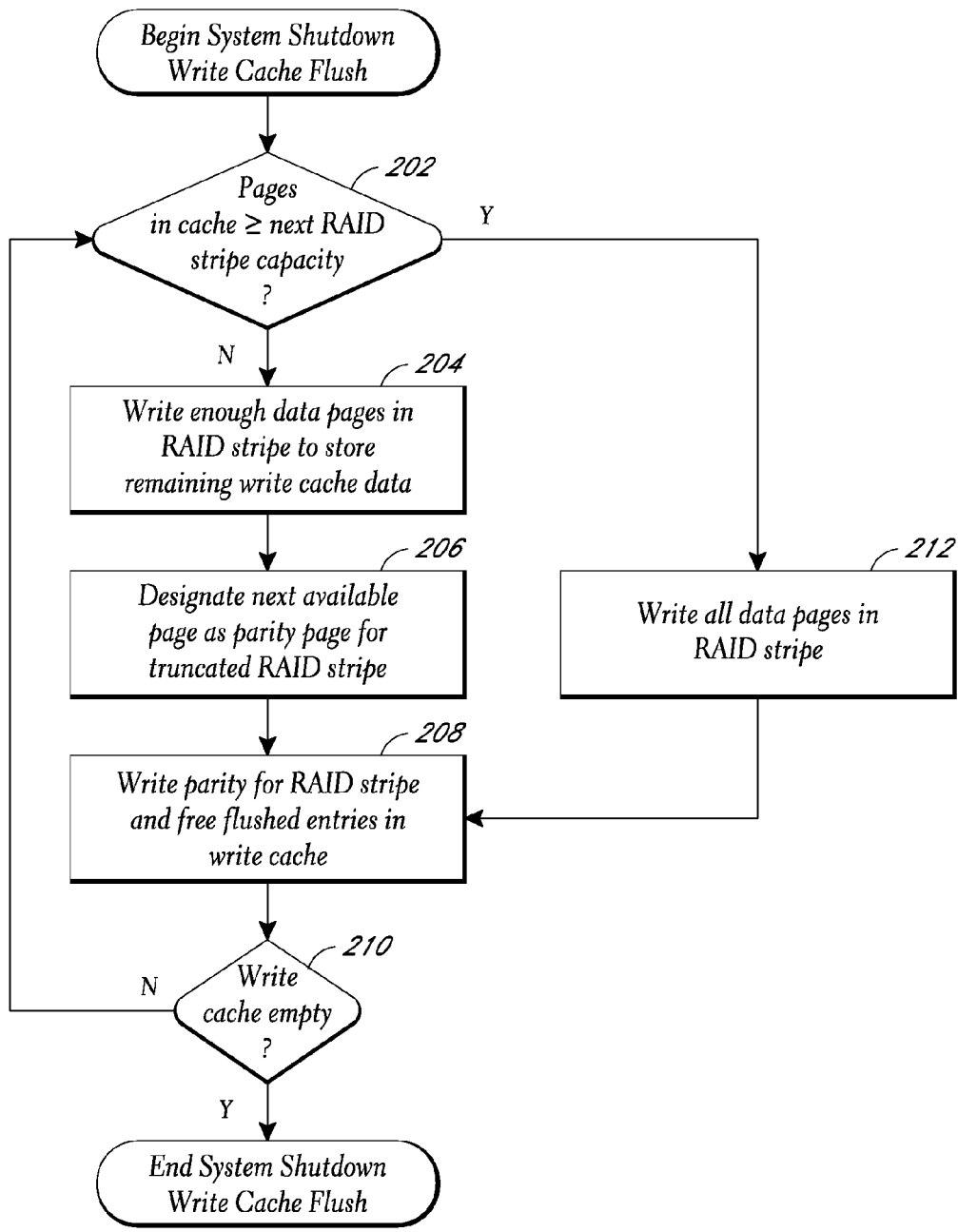
FIG. 2 is flow diagram showing a process of preserving data reliability in the event of a system shutdown according to one embodiment.

FIG. 2 is flow diagram showing a process of preserving data redundancy in the event of a system shutdown according to one embodiment. The system shutdown may occur due to an unexpected power interruption or as part of a routine shutdown that is triggered, for example, by schedule, by host command, or by other expected/planned event trigger. In any case, embodiments of the invention aid in the reduction of memory operations needed to safely power down, thereby reducing both the time and power required to complete the shutdown process. In one embodiment, the controller 150 is configured to perform the process of FIG. 2. It is noted that in the event of a power loss to the storage subsystem, backup power is likely being used by the controller for these operations described in the process of FIG. 2. The process of FIG. 2 provides a mechanism for writing a partial stripe when a system shutdown (e.g., due to sudden power loss) occurs. In contrast, when faced with a shutdown event and when there is insufficient received but not-yet-written data to create a full stripe, prior art methods and systems may instead combine the not-yet-written data with filler data to create a full stripe and its associated parity. This requires more power (e.g., backup power in the event of a power loss) to enable the creation of a full stripe.

Returning to FIG. 2, in block 202, in the event of a shutdown, the process determines whether there are sufficient pages in the write cache to write a RAID stripe of the standard size (i.e., whether the amount of pages are greater than or equal to a standard stripe size). If so, the process writes all data pages that can fit within standard size stripe in a RAID stripe in block 212, writes the parity for the new stripe in block 208, and checks whether the write cache is empty in block 210. If so (the amount of cached data is equal to the standard data stripe size), the process exits. If not, the process proceeds to block 202. Returning to block 202, if it is determined that there are fewer pages in the write cache than are required for a standard stripe size, the process moves to block 204 where it writes enough data pages in a truncated/partial RAID stripe to store the remaining write cache data. In block 206, in one embodiment, the process designates the next available page as the parity page for the truncated/partial RAID stripe. In another embodiment, the parity page may be written in another pre-designated location. In block 208, the process writes parity for the RAID stripe and free flushed entries in the write cache. In block 210, the process checks to see if the write cache is empty. If not, the process returns to block 202. If so, the process ends. Although FIG. 2 describes data as stored in units of pages, those skilled in the art will recognize that the process is applicable to systems with other memory measurement units such as blocks, sectors, etc.

In one embodiment, writing parity in the next available page is a departure from the process of writing a full stripe since parity for a full stripe is typically written in a designated location apart from where stripe data is stored. However, writing the parity in the next available page when shutdown occurs ensures that the parity is created as quickly as possible and minimizes the amount of power that is used. In one embodiment, the parity may be moved to a new location after the storage subsystem is restarted.

Partial Stripe Example

Figure 3:
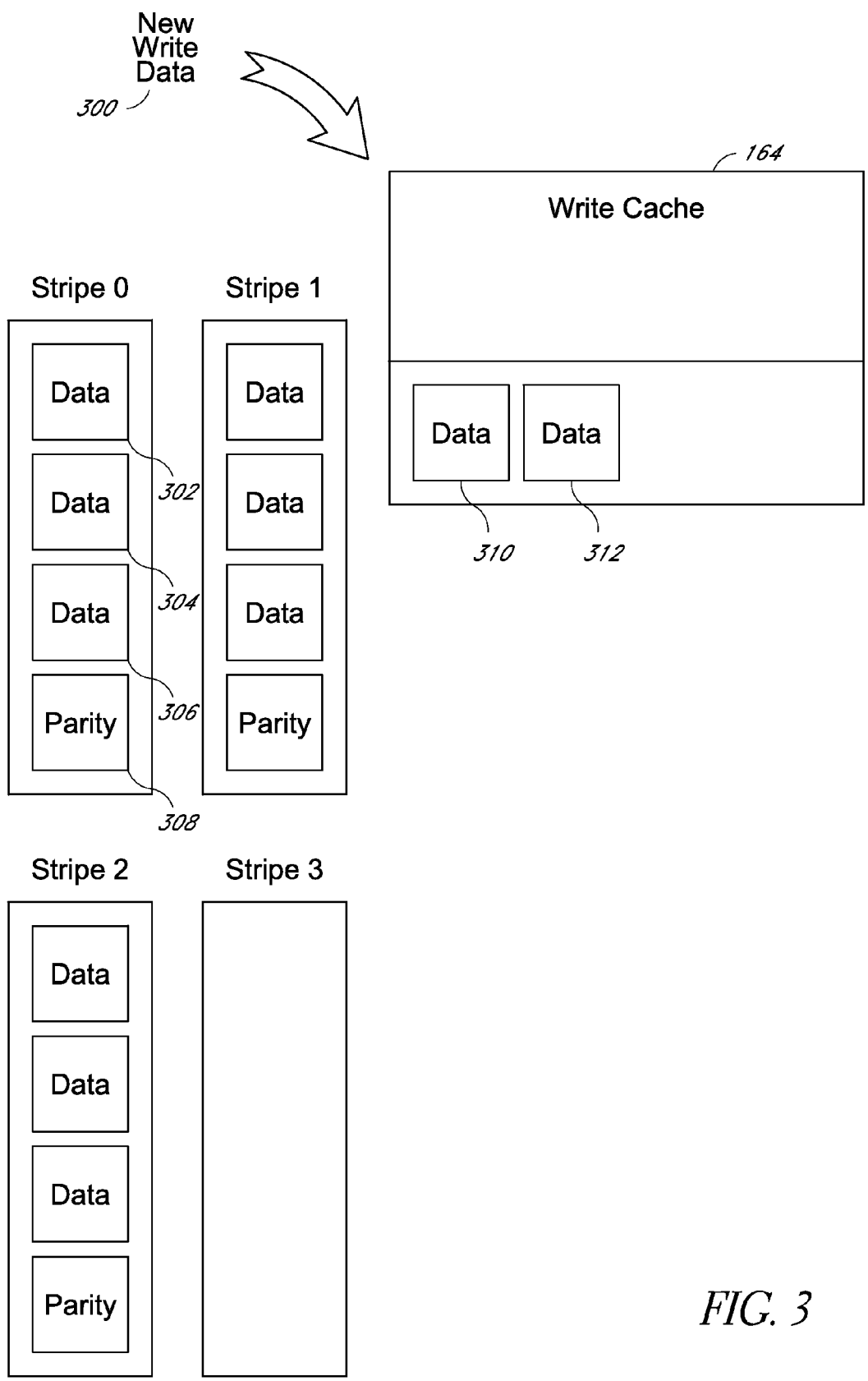
FIGS. 3-5 illustrates an example of a partial data stripe write mechanism that is used in one embodiment.
Figure 4:
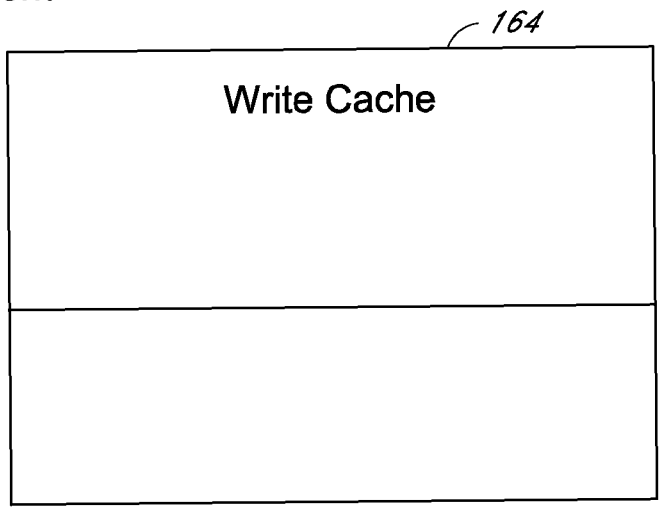
Figure 4:
Figure 4:
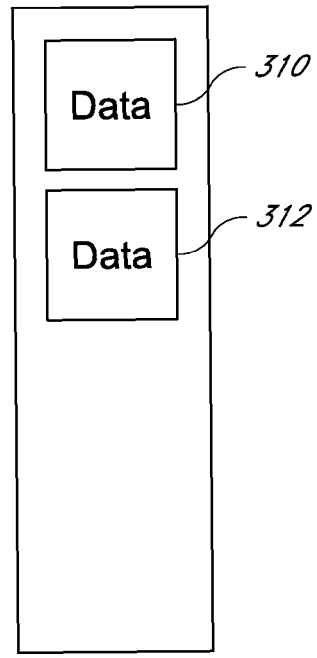
Figure 5:
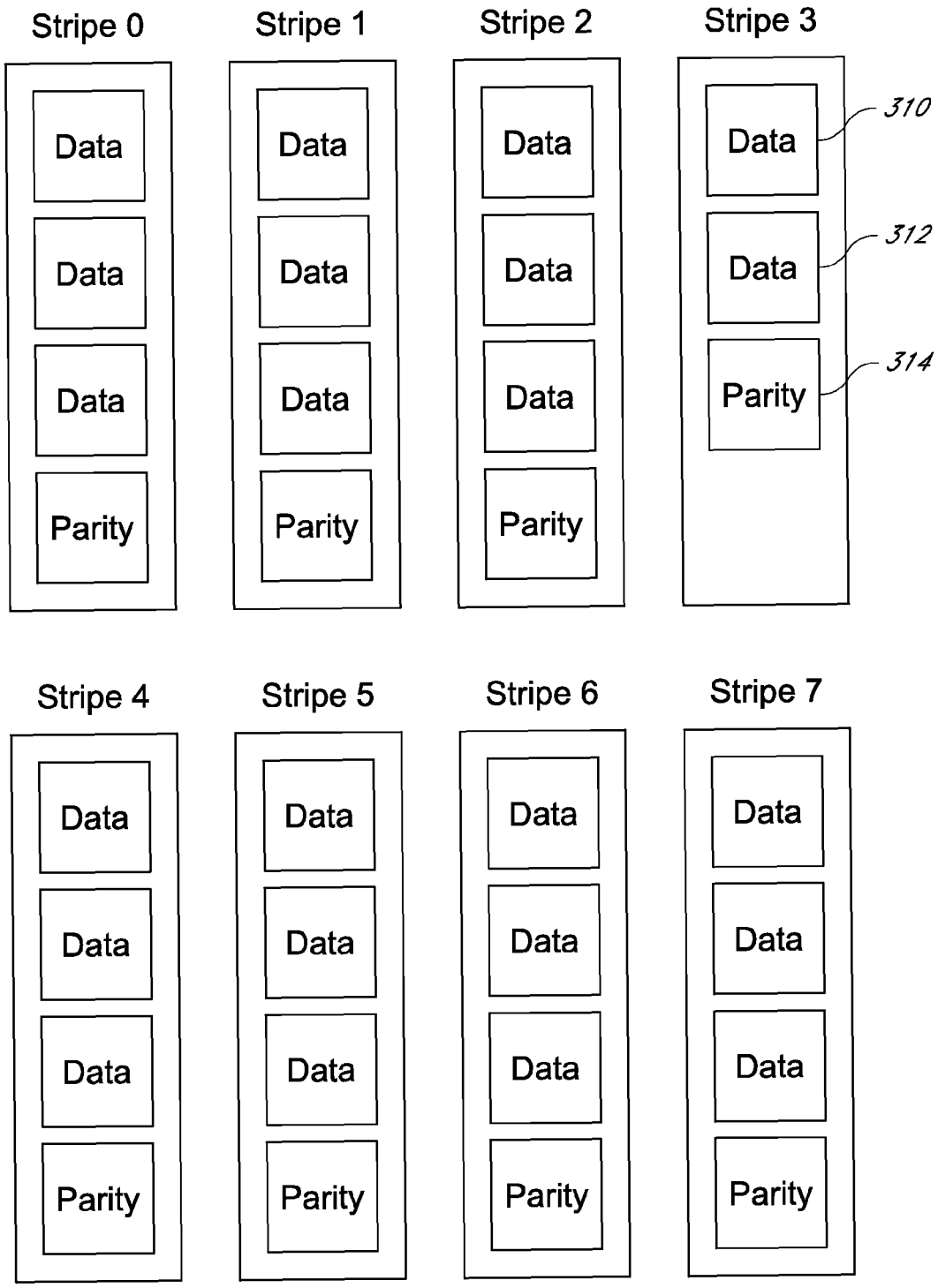

FIGS. 3-5 illustrates an example of the partial data stripe write mechanism that is used in one embodiment. FIG. 3 shows the write cache 164 configured to receive new write data 300, and is shown to be holding two units of data 310 and 312, with a unit being a page of data, a block of data, or of other sizes/granularity levels. In the non-volatile solid state memory array, as shown, stripes 0, 1, and 2 are all full stripes, and stripe 3 has not been created yet. In the example, a full stripe consists of three units of data and a parity (e.g., stripe 0 includes three units of data 302, 304, and 306 and a parity 308). The units of data and parity for each stripe may be stored in different physical storage elements in accordance with the data redundancy scheme. FIG. 4 depicts the state of the storage subsystem during a power loss event. When a power loss is detected, backup power is used to write data in the write cache to the memory array. As shown, data 310 and 312 from the write cache 164 have been written as part of what is to be stripe 3. However, they are insufficient to form a full stripe. To minimize the amount of backup power needed to ensure that data 310 and 312 are parity protected under the data redundancy scheme, the storage subsystem in one embodiment writes parity 314 immediately after data 310 and 312, forming a partial stripe, as shown in FIG. 5.

Upon recovery, the storage subsystem in one embodiment leaves the truncated/partial stripe as is (as depicted in FIG. 5) and continues to create other full-sized data stripes (as shown by stripes 4-7). In another embodiment, the storage subsystem may combine the truncated/partial stripe with other data to create a full stripe upon recovery. The data in the truncated/partial stripe may be combined with newly received write data, or filler data such as system data or pre-designated filler values such as zeros. In any case, creating a full stripe out of a partial stripe after recovery does not affect the amount of backup power that is needed, since post-recovery the storage subsystem would be operating under its regular source of power.

CONCLUSION

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A solid-state storage subsystem comprising:
a non-volatile memory array;
a write cache for temporarily storing data to be written to the non-volatile memory array;
a controller configured to:
implement a data redundancy configuration with a plurality of data stripes in the non-volatile memory array;
move data stored in the write cache to the non-volatile memory array, the data being moved in a size increment matching a pre-defined size of the data stripes in the data redundancy configuration; and
in response to detecting a start of a shutdown of the storage subsystem, move data in the write cache to the non-volatile memory array to create a partial data stripe that is smaller than the pre-defined stripe size when a quantity of the cached data is insufficient to create a data stripe of the pre-defined size, thereby reducing an amount of power needed to enable the controller to move data in the write cache to the non-volatile memory array.

2. The solid-state storage subsystem of claim 1, wherein the shutdown is triggered by a power interruption.

3. The solid-state storage subsystem of claim 2 further comprising a backup power source for supplying backup power to the storage subsystem in the event of a power interruption and wherein the controller is configured to use the backup power to move data in the write cache to the non-volatile memory array to create a partial data stripe, thereby reducing an amount of power in the backup power source needed to enable the controller to move data in the event of a power interruption.

4. The solid-state storage subsystem of claim 1, wherein the shutdown is triggered by a command from a host system in data communication with the storage subsystem.

5. The solid-state storage subsystem of claim 1, wherein the controller is further configured to store parity data related to the data moved from the write cache in the event of a power interruption in a first available memory location in the non-volatile memory array after a memory location of the partial data stripe, the first available memory location being outside of a range of pre-designated memory locations for storing parity data of the data stripes of the pre-defined size in the non-volatile memory array.

6. The solid-state storage subsystem of claim 1, wherein the controller is further configured to combine the partial data stripe with additional data stored in the write cache after the power interruption to create a data stripe of the pre-defined size.

7. The solid-state storage subsystem of claim 1, wherein the data redundancy configuration is a redundant array of independent disks (RAID) configuration.

8. A method of maintaining data redundancy in a solid-state storage subsystem in the event of a power interruption, the method comprising:
   implementing a data redundancy configuration with a plurality of data stripes in a non-volatile memory array of the solid-state storage subsystem;
   temporarily storing data to be written to the non-volatile memory array in a write cache of the solid-state storage subsystem;
   moving data stored in the write cache to the non-volatile memory array, the data being moved in a size increment matching a pre-defined size of the data stripes in the data redundancy configuration; and
   when a shutdown of the storage subsystem begins while a quantity of data in the write cache is less than the pre-defined data stripe size, writing the cached data to the non-volatile memory array to form a partial data stripe of the data redundancy configuration.

9. The method of claim 8, wherein writing the cached data to the non-volatile memory array uses a backup power source when the shutdown is triggered by a power interruption.

10. The method of claim 8, further comprising:
    storing parity data related to the data moved from the write cache in the event of a power interruption in a first available memory location in the non-volatile memory array after a memory location of the partial data stripe, the first available memory location being outside of a range of pre-designated memory locations for storing parity data of the data stripes of the pre-defined size in the non-volatile memory array.

11. The method of claim 8, further comprising:
    combining the partial data stripe with additional data stored in the write cache after the power interruption to create a data stripe of the pre-defined size.

12. The method of claim 8, further comprising combining the partial data stripe with filler data that comprises system data for solid-state storage subsystem after the power interruption to create a data stripe of the pre-defined size.

13. The method of claim 8, wherein the data redundancy configuration is a redundant array of independent disks (RAID) configuration.

14. A solid-state storage subsystem comprising:
    a non-volatile memory array;
    a backup power source for supplying backup power to the storage subsystem in the event of a power interruption;
    a controller configured to:
        receive data to be written to the non-volatile memory array;
        write the received data to the non-volatile memory array as a plurality of data stripes as part of a data redundancy configuration, each data stripe being of a pre-defined stripe size;
        create parity data for each stripe; and
        in response to detecting a power interruption to the storage subsystem,
            use the backup power to write the received data as a partial data stripe that is smaller than the pre-defined stripe size when a quantity of the received data not yet written is insufficient to create a data stripe of the pre-defined size, and
            create parity data for the partial data stripe, thereby reducing an amount of power in the backup power source needed to enable the controller to provide parity protection for the received data in the event of a power interruption.

15. The solid-state storage subsystem of claim 14, wherein the data redundancy configuration is a redundant array of independent disks (RAID) configuration.

16. The solid-state storage subsystem of claim 14, wherein the parity data is written in a memory location immediately adjacent to a memory location in which the partial data stripe is stored in the non-volatile memory array.

\* \* \* \* \*